(12) United States Patent
Hudson (10) Patent No.: US 8,118,323 B2
(45) Date of Patent: Feb. 21, 2012

(54) HITCH-AND-COUPLER ASSEMBLY

(76) Inventor: Norman John Hudson, Huerth (AU)

( * ) Notice: Subject to any disclaimer, the term of this patent is extended or adjusted under 35 U.S.C. 154(b) by 56 days.

(21) Appl. No.: 12/675,160

(22) PCT Filed: Aug. 27, 2008

(86) PCT No.: PCT/AU2008/001254
§ 371 (c)(1),
(2), (4) Date: Feb. 25, 2010

(87) PCT Pub. No.: WO2009/018628
PCT Pub. Date: Feb. 12, 2009

(65) Prior Publication Data
US 2010/0225092 A1 Sep. 9, 2010

(30) Foreign Application Priority Data
Aug. 30, 2007 (AU) ................. 2007904701

(51) Int. Cl.
*B60D 1/167* (2006.01)
(52) U.S. Cl. ........................ 280/494; 280/504
(58) Field of Classification Search .......... 280/492–494, 280/491.5, 504, 515
See application file for complete search history.

(56) References Cited

U.S. PATENT DOCUMENTS

| | | | | | |
|---|---|---|---|---|---|
| 2,027,499 | A | * | 1/1936 | Tully | 280/492 |
| 2,221,278 | A | * | 11/1940 | Willis | 280/492 |
| 2,779,607 | A | * | 1/1957 | Milhizer | 280/510 |
| 3,490,790 | A | * | 1/1970 | Kees | 280/508 |
| 4,200,306 | A | * | 4/1980 | Helms | 280/494 |
| 4,711,461 | A | * | 12/1987 | Fromberg | 280/494 |
| 5,186,483 | A | * | 2/1993 | Sheppard | 280/494 |
| 5,355,971 | A | | 10/1994 | Austin et al. | |
| 5,531,283 | A | | 7/1996 | Austin et al. | |
| 6,755,589 | B2 | * | 6/2004 | Friesen | 403/141 |
| 6,789,815 | B2 | * | 9/2004 | Moss et al. | 280/416.1 |
| 6,877,758 | B2 | | 4/2005 | Colistro | |
| 6,932,373 | B2 | * | 8/2005 | Seebohm et al. | 280/442 |
| 7,125,031 | B1 | * | 10/2006 | Schoonover | 280/293 |
| 7,527,285 | B2 | * | 5/2009 | Vachal | 280/657 |
| 7,717,454 | B2 | * | 5/2010 | Lair et al. | 280/495 |
| 7,938,431 | B1 | * | 5/2011 | Snyder | 280/494 |
| 2004/0212176 | A1 | | 10/2004 | Colistro | |

FOREIGN PATENT DOCUMENTS

| | | |
|---|---|---|
| AU | 4473885 A | 1/1986 |
| AU | 2006207859 A1 | 5/2007 |
| WO | 1998021057 | 5/1998 |

* cited by examiner

*Primary Examiner* — Tashiana Adams
(74) *Attorney, Agent, or Firm* — Fay Sharpe LLP (57) ABSTRACT

A hitch-and-coupler assembly (130) couples a trailer vehicle to a towing vehicle. The hitch-and-coupler assembly (130) includes a hitch assembly (132) having a pitch hinge part (134) that defines at least one pinhole towards its trailing end about a pitch hinge axis (138). The hitch-and-coupler assembly also includes a coupler assembly (140) having a pitch hinge counterpart (142) defining at least one pinhole (144) towards its leading end. The pitch hinge counterpart (142) is detachably connectible to the pitch hinge part (134) by positioning the pitch hinge counterpart (142) into a check position in which the pin holes (136, 144) are aligned for passing a pitch hinge pin (26) there through. The hitch-and-coupler assembly (130) also includes a guiding arrangement (146) having a guiding surface (148) extending away from the check position toward a leading end of the hitch assembly (132). The pitch hinge counterpart (142) is operatively able to engage the guiding surface (148) and is displaceable along the guiding surface (148) towards the check position.

17 Claims, 8 Drawing Sheets

HITCH-AND-COUPLER ASSEMBLY

FIELD OF THE INVENTION

This invention relates to vehicle connections. In particular, the invention relates to a hitch-and-coupler assembly for coupling a trailer vehicle to a towing vehicle, and to a method of coupling a hitch and a coupler of a hitch-and-coupler assembly. The invention extends to a towing vehicle and trailer vehicle combination incorporating the hitch-and-coupler assembly.

BACKGROUND TO THE INVENTION

A variety of vehicle connections, such as hitch-and-coupler assemblies, for coupling a trailer vehicle to a towing vehicle are known. One type of hitch-and-coupler assembly that is employed for coupling a trailer vehicle to a towing vehicle includes link members arranged to form a train of links that permits universal movement of the trailer vehicle relative to the towing vehicle when coupled to each other.

In one type of hitch-and-coupler assembly, three link members may be linked to each other with hinge-type joints so that adjacent link members may hinge relative to each other. Moreover, these hinge-type joints may be arranged with their hinge axes extending orthogonally relative to each other. This facilitates pivoting about a horizontal pitch axis transverse to the line of draft, about a vertical yaw axis transverse to the line of draft, and swiveling about a longitudinal roll axis along the line of draft. The combination of these pivoting movements when viewed together allows for universal movement of the trailer vehicle and the towing vehicle relative to each other.

For coupling and decoupling the trailer vehicle to the towing vehicle, the Applicant is aware of hitch-and-coupler type assemblies including hinge-type joints in which coupling is effected at a hinge that pivots about a yaw axis. This means that the link member forming part of the coupler assembly of the trailer vehicle has to be aligned with the link member forming part of the hitch assembly, by maneuvering the front end of the trailer vehicle by pushing or pulling and tilting the trailer vehicle.

In particular in cross-country applications, users may find it difficult manually to maneuver the trailer vehicle relative to the towing vehicle for aligning holes of the link members for passing a hinge pin there through. This is especially so in circumstances when the trailer vehicle and the towing vehicle are supported on an uneven rough cross-country terrain, and the link members are to be aligned by translational movement of the towing vehicle or the trailer vehicle. It is difficult to effect fine tolerance alignment of link members by gross movements of a vehicle.

The manual maneuverability of the trailer vehicle may further be impaired by its weight, size, and the like.

Clearly it would advantageous if a contrivance could be devised that alleviates at least part of the difficulties a user may encounter when coupling a trailer vehicle to a towing vehicle under such circumstances.

SUMMARY OF THE INVENTION

Accordingly, the invention provides a hitch-and-coupler assembly which includes:

a hitch assembly having a pitch hinge part defining at least one pinhole towards a trailing end of the hitch assembly about a pitch hinge axis; and a coupler assembly having a pitch hinge counterpart defining at least one pinhole towards a leading end of the coupler assembly, the pitch hinge counterpart being detachably connectible to the pitch hinge part by positioning the pitch hinge counterpart into a check position in which the pin holes are aligned for passing a pitch hinge pin there through; and a guiding arrangement having a guiding surface on the hitch assembly, which guiding surface extends away from the check position toward a leading end of the hitch assembly, so that the pitch hinge counterpart is operatively able to engage the guiding surface and displaceable along the guiding surface towards the check position.

The hitch assembly may include laterally spaced apart opposing elongated hitch side walls, each hitch side wall defining a pinhole towards its trailing end, which pinholes are axially aligned about the pitch hinge axis.

The hitch-and-coupler assembly may include a hitch mounting arrangement for mounting the hitch assembly onto a hitch mount of a towing vehicle. The hitch mounting arrangement may include a hitch mounting wall extending transversely across the space between the hitch sidewalls from near the leading end of the hitch sidewalls towards a rear end of the hitch sidewalls.

The mounting wall may extend along opposing front portions of the hitch sidewalls, so that a vertically open through passage is defined between opposing rear portions of the hitch sidewalls.

The guiding arrangement may include a guide formation extending between the hitch sidewalls. The guide formation may define an operatively upwardly facing guiding surface extending away from the check position toward a leading end of the hitch assembly.

The guide formation may include a guide wall extending between the hitch sidewalls, which guide wall slants from upper edges of the sidewalls towards lower edges of the sidewalls in a direction towards the trailing end of the sidewalls. The guide wall may extend at least partly across the opening between the rear portions of the sidewalls and the guide wall may define a cutaway.

The guide wall may be rectangular U-shaped in which a cross limb of the guide wall may extend between the sidewalls towards upper edges of the sidewalls and side limbs of the guide wall may slant towards the lower edges of the sidewalls in the direction towards the trailing end of the sidewalls.

The coupler assembly may include a yaw-pitch link member having the pitch hinge counterpart towards its leading end and a yaw hinge part towards its trailing end, which yaw hinge part defines at least one pinhole about a yaw axis of the hitch-and-trailer assembly.

The pitch hinge counter part may include an elongated pitch hinge sleeve defining an axially extending through bore. The pitch hinge sleeve may have an axial length for sliding fitment lengthwise between the hitch side walls above the guide wall. Thus, the guide surface of the guide wall is engaged by an outer radial surface of the pitch hinge sleeve and slidably displaceable along the guide surface into the check position in which the through bore is axially aligned with the pin holes of the side walls.

The guiding arrangement may include at least one check formation that is mounted towards a rear end of the sidewalls against which check formations the pitch hinge sleeve checks when it reaches the check position. The check formation may include two check formations that are mounted opposite each other on the sidewalls so that a space is defined between the check formations.

Also, the yaw hinge part may include an elongated yaw hinge sleeve defining an axially extending through bore about the yaw axis. The pitch hinge sleeve and the yaw hinge sleeve may be orthogonally mounted to each other intermediate their ends, so that the pitch hinge axis extends orthogonally relative to the yaw hinge axis.

The coupler assembly may include a roll hinge about a roll axis having a yaw hinge counterpart towards its leading end that defines at least one pinhole for axially aligning with the pin holes of the yaw hinge part. The coupler assembly may include a yaw bolt for passing through the pinholes of the yaw hinge part and the yaw hinge counter part when they are aligned, and a nut for screwing onto a protruding end of the yaw bolt.

The roll hinge may include a roll hinge sleeve and a roll hinge shaft coaxially mounted within the sleeve for coaxial rotation relative to the sleeve about the roll axis, in which case, the yaw hinge counterpart may be at a front end of the roll hinge shaft.

The yaw hinge counterpart may include a clevis formation having opposed clevis arms defining opposed pinholes that are axially spaced about the yaw axis, the clevis arms defining a space between them for receiving the yaw hinge sleeve lengthwise between them with its through bore axially aligned with the bolt holes of the clevis arms about the yaw axis.

The coupler assembly may include a coupler mounting arrangement for mounting the coupler onto a coupler mount of a trailer vehicle.

The coupler mounting arrangement may include a coupler mounting plate defining at least one coupler mounting hole there through, and the roll hinge sleeve may be mounted onto the coupler mounting plate.

The invention also provides a method of coupling a coupler assembly detachably to a hitch assembly, which method includes:

providing a hitch assembly having a pitch hinge part defining at least one pinhole towards a trailing end of the hitch assembly about a pitch hinge axis; and providing a coupler assembly having a pitch hinge counterpart defining at least one pinhole towards a leading end of the coupler assembly, the pitch hinge counterpart being detachably connectible to the pitch hinge part by positioning the pitch hinge counterpart into a check position in which the pin holes are aligned for passing a pitch hinge pin there through; and providing a guiding arrangement having a guiding surface on the hitch assembly, which surface extends from the check position toward a leading end of the hitch assembly, so that the pitch hinge counterpart is operatively able to engage the guiding surface and displaceable along the guiding surface towards the check position.

Providing a hitch-and-coupler assembly may include spacing two hitch side walls laterally apart, so that they oppose each other, each hitch side wall defining a pinhole towards its trailing end, which pinholes are axially aligned about the pitch hinge axis.

Further, providing the guiding arrangement may include providing a guide formation extending between the hitch sidewalls, which guide formation defines an operatively upwardly facing guiding surface extending away from the check position toward a leading end of the hitch assembly. Providing the guide formation may include providing a guide wall that extends between the hitch sidewalls and slanting from upper edges of the sidewall towards lower edges of the side wall in a trailing direction.

The method may include providing a pitch hinge sleeve at the leading end of the coupler assembly, which pitch hinge sleeve may form the pitch hinge counter part. The pitch hinge sleeve may have an axially extending through bore and an axial length for sliding fitment lengthwise between the hitch side walls above the guide wall. Thus, the method may include engaging the guide surface with an outer radial surface of the pitch hinge sleeve and sliding the pitch hinge sleeve along the guide surface into the check position against the check formations, in which position the through bore is axially aligned with the pin holes of the side walls.

The method may include passing a pitch hinge pin through the pin holes of the hitch sidewalls and the through bore of the pitch hinge sleeve, and securing the pitch hinge pin against unauthorized removal.

The invention further provides a towing vehicle and trailer vehicle combination which includes:

a hinge-and-coupler assembly as defined above; a hitch of the assembly being mounted on the towing vehicle, and a coupler of the assembly being mounted on the trailer vehicle.

The hitch-and-coupler assembly may include any one or more of the optional features of a hitch-and-couple assembly as herein defined, described and illustrated.

The invention extends to a hitch-and-coupler assembly for coupling a trailer vehicle to a towing vehicle for towing the trailer vehicle along a line of draft, which hitch-and-coupler assembly includes:

a first link member forming part of a hitch assembly mountable on the towing vehicle and a second link member forming part of the coupler assembly mountable on a leading end of the trailer vehicle, the first link member and the second link member when coupled in their engaging relationship being operatively able to pivot about a horizontal axis transverse to the line of draft; and a guiding arrangement forming part of the hitch assembly, the guiding arrangement being for receiving the second link member as the leading end of the trailer vehicle is lowered from above the first link member and to guide the second link into its engaging relationship with the first link member.

The first link member may include a first link member mounting arrangement for mounting the link member to a hitch receiver of the towing vehicle. The first link member mounting arrangement may include first link member fastening means for fastening the first link member to the hitch receiver.

The hitch receiver may be a hitch tongue projecting rearwards from the towing vehicle, in which case the first link member mounting arrangement may include a first link base member defining at least one hole there through, and the first link member fastening means may include a bolt and nut for bolting the base member to the hitch tongue.

A trailing end portion of the first link member and a leading end portion of the second link member may be counterparts of a first hinge, through which portions holes are defined that align when the first link member and the second link member are in their engaging relationship. The first hinge may comprise a first pivot pin for passing through the holes of the first and second link members about which the first link member and the second link member may pivot about a horizontal axis transverse to the line of draft.

The guiding arrangement forming part of the hitch assembly may include guide formations that define a guide passage that is open and within which the leading end of the second link member is receivable as it is displaced downwardly by lowering of the leading end of the trailer vehicle.

The guide formations may include guide walls that include laterally spaced apart guide sidewalls fixed on the first link base member, and a landing wall extending transversely between the two guide sidewalls, which landing wall may slant with its lower edge trailing and extending laterally across the base member and its upper edge leading, the guide passage thus being defined between the guide sidewalls and the landing wall. The landing wall may define a landing surface facing obliquely rearwards onto which landing surface the leading end of the second link member may land inside the guide passage for guiding the second link member in abutment with the landing wall downwardly as the leading end of the trailer vehicle is lowered.

When the leading end of the trailer vehicle is lowered onto the landing wall and then further lowered, then the landing wall will exert a component of force against the second linking member in the rearwards direction which would tend automatically to displace the trailer vehicle away from the towing vehicle while the second link member remains in abutment with the landing wall until the first link member reaches its coupled position relative to the first link member.

The first link member may include a blocking arrangement for stopping the second link member from being displaced beyond the position in which it is in its engaging relationship with the first link member. The blocking arrangement may include a pin extending between the guide sidewalls across the guide passage opposite the landing surface and located to stop the second link member from being displaced beyond the position in which it is in its engaging relationship with the first link member, in other word, when the first link member reaches its coupling position.

The coupler assembly may include a third link member that couples to a trailing end portion of the second link member so that the third link member and the second link member are operatively able to pivot relative to each other about a vertical pivot axis that extends orthogonally relative to the horizontal pivot axis of the first hinge.

The trailing end portion of the second link member and a leading end portion of the third link member may form counterparts of a second hinge, which counterparts have holes that align so that a second pivot pin can be passed through the holes, about which second pivot pin the second link member and the third link member may pivot about the axis orthogonal to the horizontal transverse axis of the first hinge.

The third link member may include a third link member mounting arrangement for mounting the third link member to the leading end of the trailer vehicle, for example onto a drawbar of the trailer vehicle. The trailer vehicle may include a coupler receiver forming part of the drawbar onto which the third link member is mounted.

The third link member mounting arrangement may include a third link base member having holes there through and third link fastening means, for example bolts and nuts for bolting the third link base member to the coupler receiver of the trailer vehicle.

The third link member may include a swivel arrangement for connecting the front end portion of the third link member operatively able to swivel relative to the third link member mounting arrangement about an axis extending in the direction of the line of draft, so that the trailer vehicle may swivel relative to the towing vehicle about the said axis.

The swivel arrangement may include a cylindrical swivel sleeve axially directed in the direction of the line of draft when the third link mounting arrangement is mounted onto the leading end of the trailer, and a swivel pin projecting rearwards from the leading end portion of the third link member, which swivel pin is receivable axially within the swivel sleeve, thereby to permit swiveling about the axis extending in the direction of the line of draft.

The first link member may include a first pivot pin securing arrangement for securing the first pivot pin from leaving the aligned holes of the first hinge once the pivot pin is inserted through the aligned holes of the first hinge when the first link member is coupled to the second link member. The first pivot pin securing means may include a key projecting from the pin and a key catch provided on the first link member for receiving the key once the first pivot pin is received within the aligned holes.

The key may be in the form of a tab projecting transversely from a shank of the pivot pin and the key catch may be formed by a key catch wall mounted to an outside of one of the guide sidewalls so that a key receipting cavity is defined between the key catch wall and the guide sidewall, so that the key cavity has an opening through which the key may pass to enter the key receipting cavity once the first pivot pin is positioned within the aligned holes of the first hinge. The key catch may also include a closure member biased towards a position in which it closes the opening through which the key passes when entering the key catch cavity, thereby further to prevent the key from accidentally leaving the key catch cavity.

The invention also extends to a trailer vehicle for coupling to a towing vehicle for towing the trailer vehicle along a line of draft, which trailer includes a hitch-and-coupler assembly as defined and describe above.

The hitch and coupler assembly may include any one or more of the features as defined and described above.

The invention further extends to a method of coupling a trailer vehicle to a towing vehicle for towing the trailer vehicle along a line of draft, which method includes:

providing a towing vehicle having a first link member forming part of a hitch assembly and providing a trailer vehicle having a second link member forming part of a coupler assembly on a leading end thereof, so that the first link member and the second link member when coupled in their engaging relationship are operatively able to pivot about a horizontal axis transverse to the line of draft; and positioning the trailer vehicle and towing vehicle relative to each other so that the second link member is above the first link member; and lowering the leading end of the trailer vehicle so that the second link member engages a guiding arrangement forming part of the hitch assembly, so that the guiding arrangement guides the first link member into its engaging relationship with the second link member as the coupler assembly is forced downwardly into abutment with the guiding arrangement by lowering of the leading end of the trailer vehicle.

The method may include mounting a first link member forming part of a hitch assembly onto the towing vehicle and mounting a second link member forming part of a coupler assembly onto a leading end of the trailer vehicle, so that the first link member and the second link member when coupled in their engaging relationship are operatively able to pivot about a horizontal axis transverse to the line of draft.

Mounting the first link member may include mounting it onto a tow bar of the towing vehicle, and mounting the second link member may include mounting it on a leading end of a drawbar of the trailer vehicle.

Mounting the second link member may include mounting it to a third link member forming part of the coupler assembly, so that the third link member and the second link member are operatively able to pivot relative to each other about a vertical pivot axis that extends transverse to the line of draft and orthogonally relative to the horizontal pivot axis of the first hinge, in which case, the third link member is mounted to the drawbar of the trailer vehicle.

The method may include mounting the front end portion of the third link member with a swivel arrangement operatively able to swivel relative to the trailer vehicle about an axis extending in the direction of the line of draft, so that the trailer vehicle may swivel relative to the towing vehicle about the same axis.

DETAILED DESCRIPTION OF THE PREFERRED EMBODIMENTS

A hitch-and-coupler assembly, in accordance with the invention, may manifest itself in a variety of forms. It will be convenient to hereinafter describe in detail a preferred embodiment of the invention with reference to accompanying drawings. The purpose of providing this detailed description is to instruct persons having an interest in the subject matter of the invention how to carry the invention into practical effect. However it is to be clearly understood that the specific nature of this detailed description does not supersede the generality of the preceding broad description.

In the drawings, reference numeral 100 generally refers to a trailer vehicle, in accordance with the invention, incorporating a hitch-and-coupler assembly, generally indicated by reference numeral 10. The trailer vehicle 100 is coupled to a towing vehicle 102 for towing the trailer vehicle 100 along a line of draft indicated by arrow 104.

The hitch-and-coupler assembly 10 includes a first link member, generally indicated by reference numeral 12 forming part of a hitch assembly 106 mounted on the towing vehicle 102. The hitch-and-coupler assembly 10 also includes a second link member, generally indicated by reference numeral 14 forming part of a coupler assembly, generally indicated by reference numeral 108 mounted on a leading end, at 110, of the trailer vehicle 100.

The first link member 12 and the second link member 14 when coupled in their engaging relationship (see FIG. 1) is operatively able to pivot about a horizontal axis 16 transverse to the line of draft 104.

Figure 6:
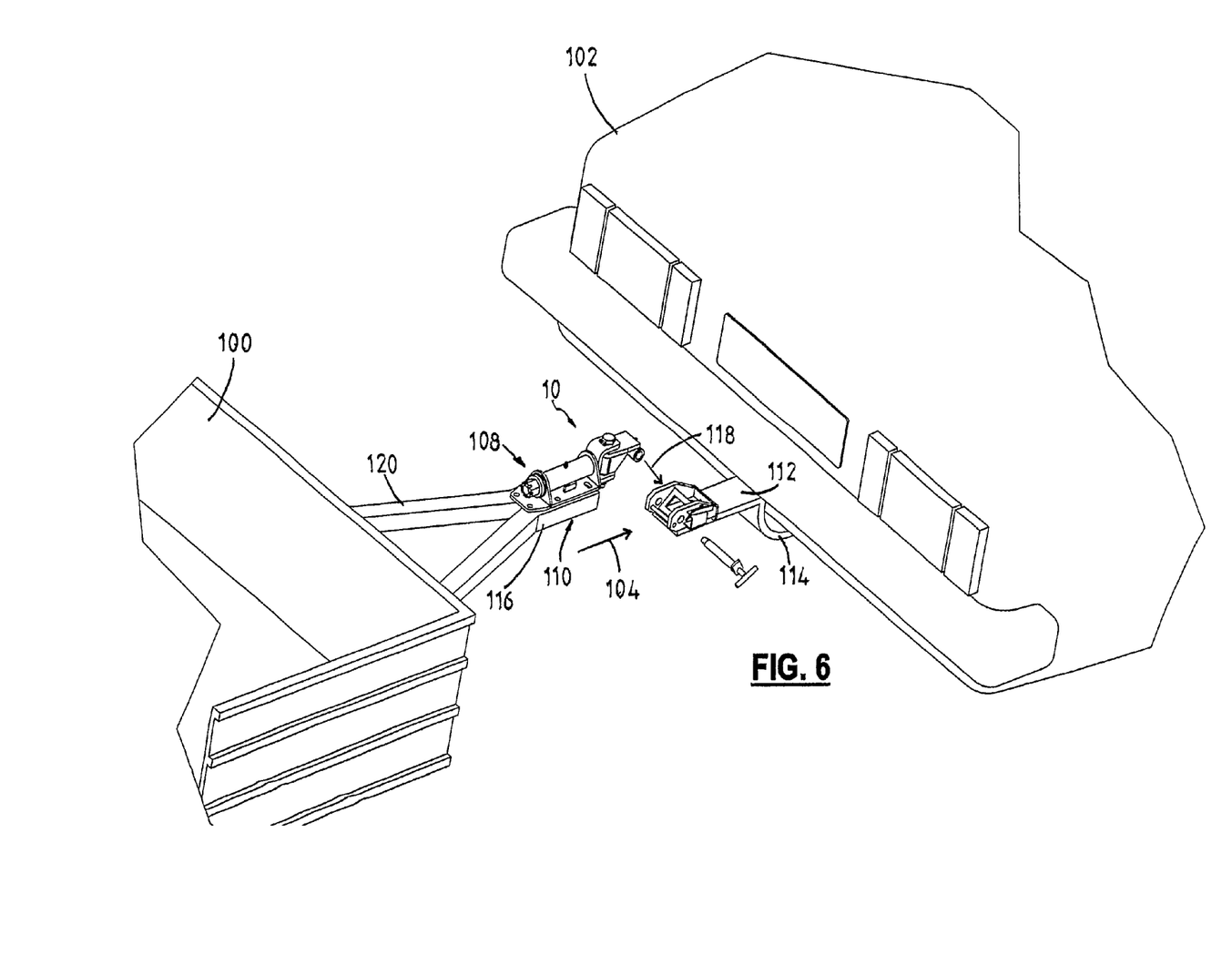
FIG. 6 shows a three-dimensional view of part of a trailer vehicle and part of a towing vehicle incorporating the hitch-and-coupler assembly of FIG. 1.

The hitch-and-coupler assembly 10 also includes a guiding arrangement, generally indicated by reference numeral 18, forming part of the hitch assembly 106. The guiding arrangement 18 is for guiding the second link member 14 into its engaging relationship with the first link member 12 as the coupler assembly 108 is displaced downwardly, see arrow 118 in FIG. 6, into abutment with the guiding arrangement 18. This is achieved by lowering of the leading end, at 110, of the trailer vehicle 100 and then by some relative translational displacement of the trailer and towing vehicle relative to each other. Conveniently it may be the trailer that is moved away from the towing vehicle but that need not be the case. It could also be effected by a subtle forward movement of the towing vehicle.

The first link member 12 includes a first link member mounting arrangement, generally indicated by reference numeral 20, for mounting the first link member 12 to a hitch receiver 112 of the towing vehicle 102. The hitch receiver 112 forms part of a tow bar 114 of the towing vehicle 102.

The hitch receiver 112 is in the form of a conventional hitch tongue projecting rearwards from the towing vehicle 102 and has a hitch receiver hole through it. The first link member mounting arrangement 20 includes a first link base member 22 in the form a generally rectangular base plate defining a hole there through. The first link member mounting arrangement 20 also includes a first link member fastening means 24 for fastening the first link member to the hitch receiver 112. The first link member fastening means 24 includes a bolt and nut for bolting the rectangular base plate 22 to the hitch tongue projecting from the towing vehicle 102. The nut 24 can be of the lock-nut type to prevent loosening thereof from induced vibration, in use.

Figure 1:
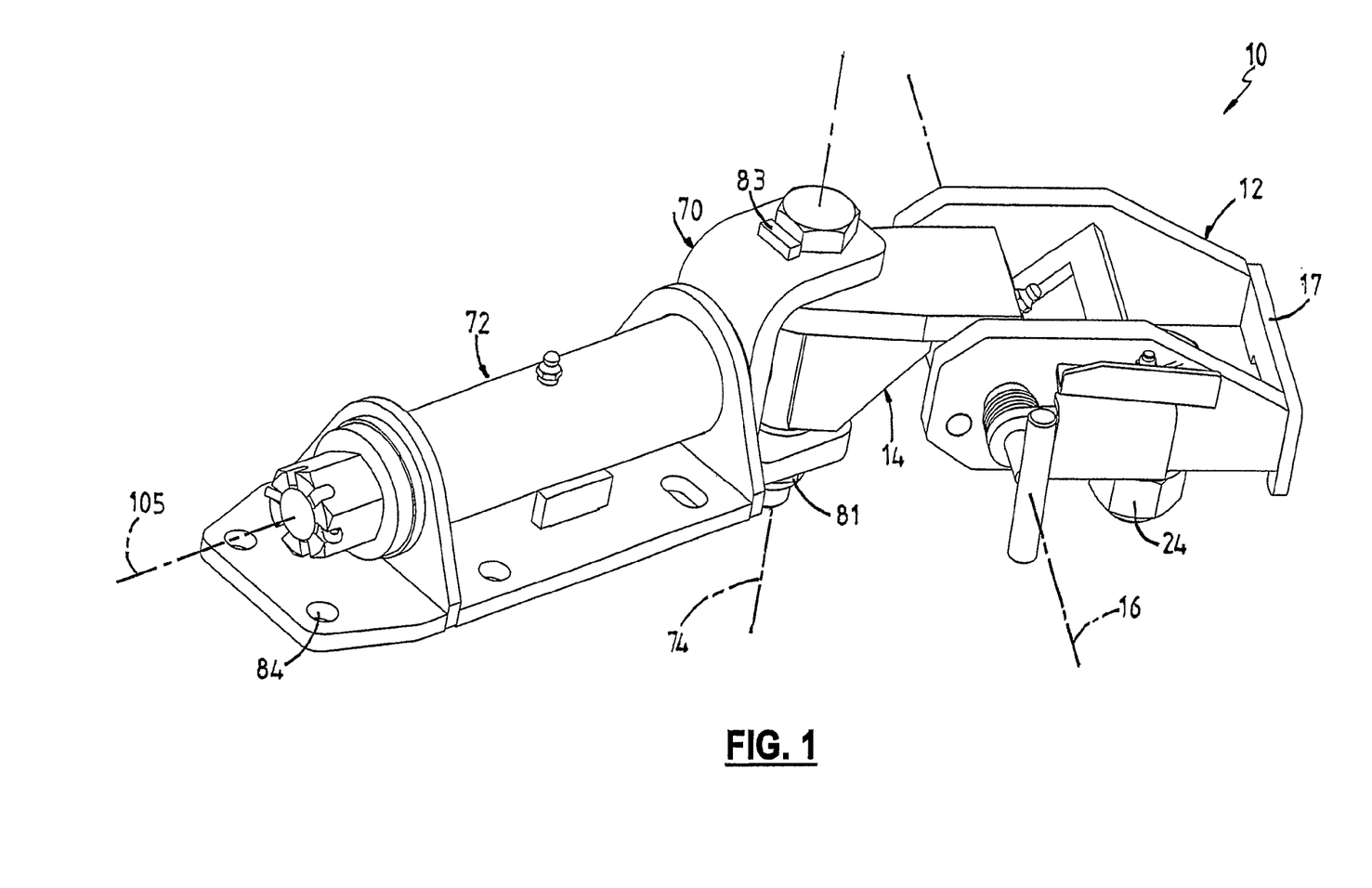
FIG. 1 shows a three-dimensional view of a hitch-and-coupler assembly, in accordance with the invention.
Figure 2:
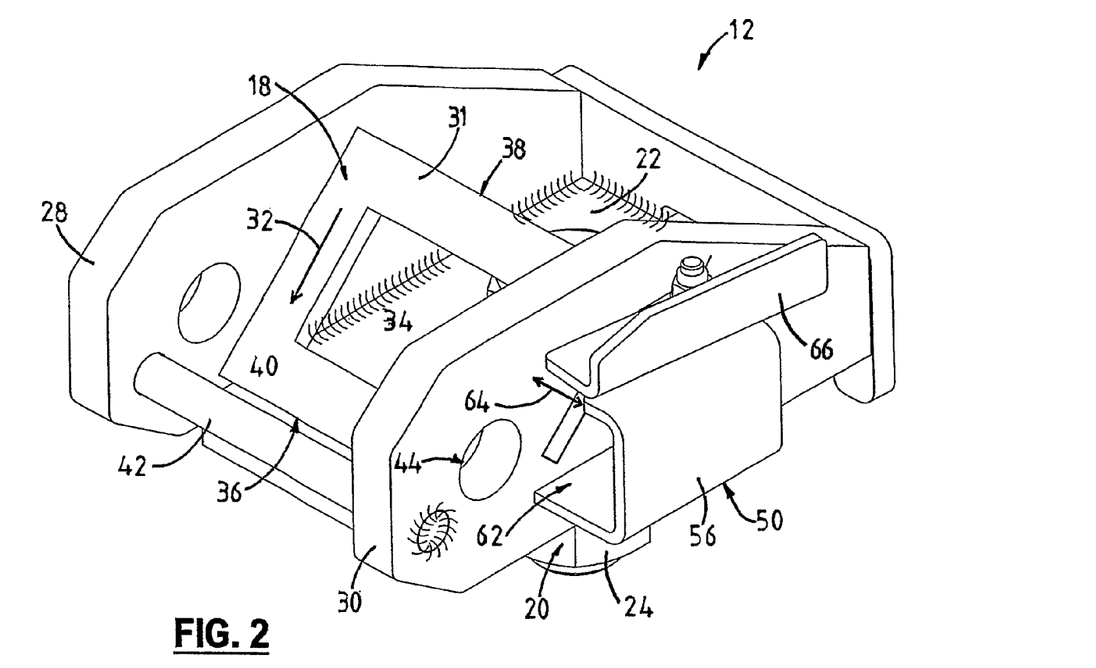
FIG. 2 shows a three-dimensional view of a first link member forming part of the hitch-and-coupler assembly in FIG. 1.
Figure 3:
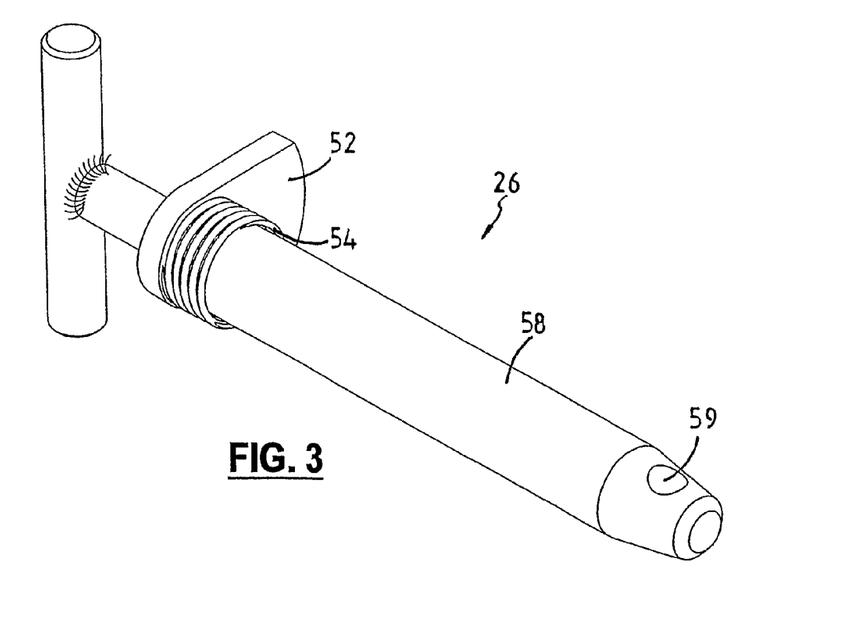
FIG. 3 shows a three-dimensional view of a first pivot pin forming part of the first link member in FIG. 2.

A trailing end portion of the first link member 12 and a leading end portion of the second link member 14 together form a first hinge. The first link member 12 and the second link member 14 have holes 44 and a bore 48 respectively that align when the first link member 12 and the second link member 14 are in their engaging relationship, as shown in FIG. 1. A first pivot pin, generally indicate by reference numeral 26, passes through the holes 44 and bore 48 about which the first link member 12 and the second link member 14 can pivot about the horizontal axis 16 transverse to the line of draft 104 to pivotably attach the links 12, 14 to each other.

The guiding arrangement 18 forming part of the hitch assembly 106 includes guide walls 28 and 30 that define a guide passage, see arrow 32, that is open rearwards and upwards and within which the leading end of the second link member 14 is received for guiding the second link member 14 downwardly along the passage 32 as the leading end 110 of the trailer vehicle 100 is lowered. The term guide passage is to be interpreted broadly and includes in particular an open passage as shown in the drawings.

The guide walls 28, 30 include transversely spaced apart guide sidewalls fixed on the base plate 22, and a landing wall 31 extending transversely between the two guide walls 28. The guide sidewalls 28, 30 are formed from plates opposing each other and welded in place to the transverse edges of the base plate 22. The landing wall 31 is formed from a rectangular plate having a concentric cutout 34. The landing wall 31 slants with its lower edge 36 trailing and fixed to the base plate 22 and its upper edge 38 leading. Thus, the guide passage 32 is defined between the guide sidewalls 28, 30 and the landing wall 31. The guide walls 28, 30 each define one said hole 44 which form part of the first hinge.

The landing wall 31 thus has a landing surface 40 facing obliquely rearwards and upwards, onto which landing surface 40 the leading end of the second link member 14 lands. The landing surface 40 guides the second link member 14 downwardly during lowering of the leading end 110 of the trailer vehicle 100.

The cutout 40 serves as an opening through which debris can fall should it land within the guide passage 32, to prevent buildup of dirt or debris inside the guide passage 32.

The first link member 12 also include a blocking pin 42 that is fixed between the two guide walls 28, 30 and that extends transversely across the guide passage 32. The blocking pin 42 is for stopping the second link member 14 from slipping out of a lower end of the guide passage 32 once the second locking member 14 reaches its coupled position in which the holes 44 and bore 48 is aligned.

The second link member 14 includes a coupling formation 46 in the form of cylindrical sleeve having an axial bore there through. The coupling formation has an axial length to fit snugly transverse within the guide passage 32 and to rest snugly in a lower region of the guide passage 32 between and in abutment with the landing wall 31 and the blocking pin 42 in a coupling position. The axial bore 48 of the coupling formation 46 aligns with the holes 44 in the guide walls 28 in the coupling position. The first pivot pin 26 is passed though the aligned holes 44 and the bore 48 to form the first hinge about axis 16.

The first link member 12 also includes a first pivot pin securing arrangement 50, 52, 54 for resisting the first pivot pin 26 from leaving its associated holes once the pivot pin 26 is inserted therein. The first pivot pin securing means includes a key 52 projecting from a shank 58 of the pin 26 and a key catch 56 provided on the first link member 12 for retaining the key 52 once the first pivot pin 26 is received within the aligned holes 44 and bore 48.

The key 52 is in the form of a parabolic tab projecting transversely from the shank 58 of the pivot pin 26. The key catch 50 is formed by a key catch wall that is formed by a bend plate to have a U-shaped section, with one leg of the U-shaped section being shorter that the other one. Thus, when the key catch wall 56 is mounted to an outside of the guide sidewall 30, a key receiving cavity 62 is defined between the key catch wall 56 and the guide sidewall 30. A gap 64 is left between an edge of the short leg of the U-shaped sectioned catch wall 56 and the guide wall 30 through which gap 64 the tab 52 can pass into the key cavity 62.

The pivot pin 26 also includes a biasing means in the form of a coil spring 54, for forcing the axially directed outer surface of the tab 52 against an inner surface of the key catch wall 56, to prevent accidental withdrawal of the key 52 through the gap 64. The key securing means 50 further includes a closure member 66 that is spring-loaded so that it is displaceable to open the gap 64 but biased to a position in which it closes the gap 64 further to resist the tab 52 from unauthorized removal.

Figure 4:
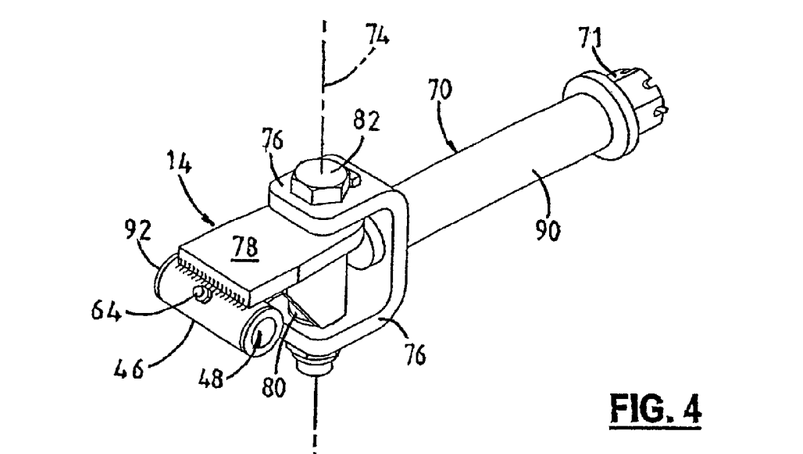
FIG. 4 shows a three-dimensional view of a second link member and part of a third link member forming part of the hitch-and-coupler assembly.
Figure 5:
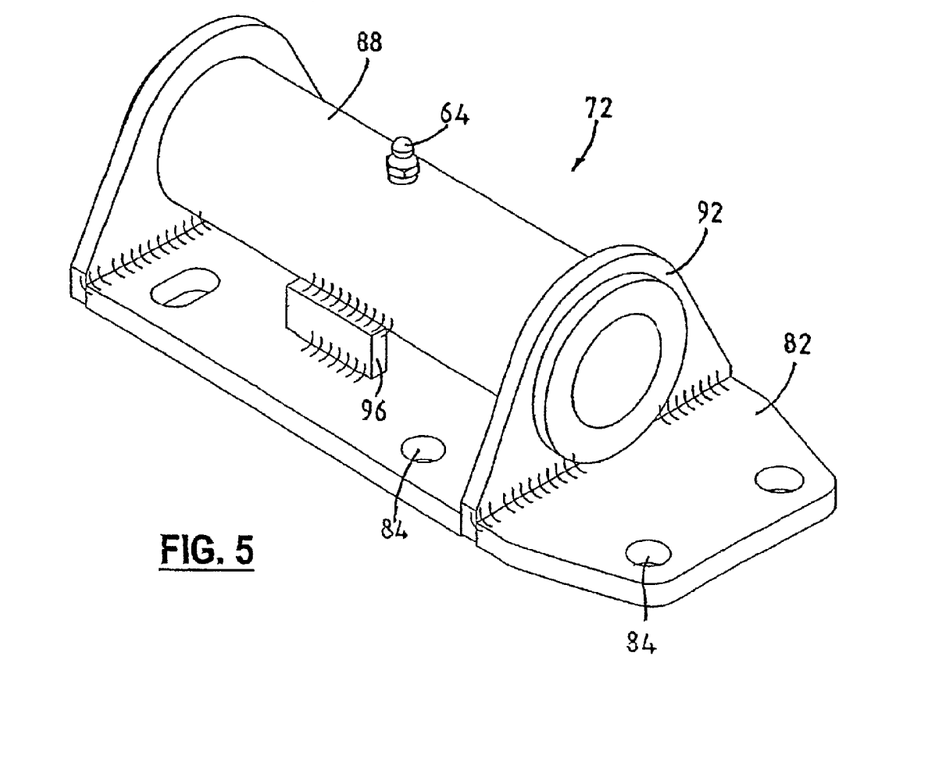
FIG. 5 shows a three-dimensional view of a remaining part of the third link member in FIG. 4.

The coupler assembly 108 includes a third link member of which part is shown in FIG. 4 and indicated by reference numeral 70 and its remaining part is shown in FIG. 5 and generally indicated by reference numeral 72. A leading end of the third link member 70, 72 couples to a trailing end portion of the second link member 14 so that the third link member 70, 72 and the second link member 70 are operatively able to pivot relative to each other about a vertical pivot axis 74 orthogonally relative to the horizontal pivot axis 16 of the first hinge. Thus the trailing end portion of the second link member 14 and a leading end portion of the third link member 70, 72 together form a second hinge.

The leading end portion of the third linking member 70 forms one part of a clevis having two spaced clevis prongs 76 having holes defined in them. The second link member 14 include a top plate 78 which is welded to the coupling formation 46 at one end and from its other end a clevis sleeve 80 depends downwardly through which a bore is defined. The clevis sleeve 80 has an axial length that can be received in the space between the prongs 76. The holes in the prongs 76 are aligned with the bore through the clevis sleeve 80.

A second link fastening means in the form of a bolt and nut 81 is passed through the holes 76 and the bore of the sleeve 80.

The third link member 70,72 also includes a third link member mounting arrangement 82 in the form of a base member or plate having a plurality of holes 84 there through for mounting the third link member 70, 72 to the leading end 110 of the trailer vehicle 100. In this embodiment, the base plate 82 is mounted to a drawbar 120 of the trailer vehicle 100. The trailer vehicle 100 has a coupler support 116 forming part of the drawbar 120.

To this end, the third link member 70, 72 also includes a swivel arrangement for connecting the front end portion, or clevis prongs 76, of the third link member 70, 72 operatively able to swivel relative to the third link member mounting arrangement 82 about an axis extending in the direction of the line of draft 104, so that the trailer vehicle 100 can swivel relative to the towing vehicle 102 about the axis 105 that coincide with the line of draft when the trailer vehicle 100 is aligned with the towing vehicle 102.

The swivel arrangement includes a cylindrical swivel sleeve 88 axially directed in the direction of the line of draft when the third link mounting arrangement 82 is mounted at the leading end 110 of the trailer 100. The swivel arrangement also includes a swivel shaft 90 projecting rearwards from the leading end portion of the third link member 14. The swivel shaft 90 is receivable axially within the swivel sleeve 88, thereby to permit swiveling about the axis. The swivel shaft 90 is retained in its position by a lock nut 71 cooperating with a screw-threaded end of the swivel shaft 90 that projects outside the bore of the swivel sleeve 88.

The swivel sleeve 88 is mounted onto the base plate 82 with welding and weld-bridge formations 96.

The sleeves and/or coupling formations 88, 80, and 46, have bushes 92 inside them to permit smooth hinging or pivoting about their respective axis and to protect the sleeves and/or coupling formations from wear and tear. The sleeves and/or coupling formations are also equipped with grease-nipples 64 for maintenance lubrication.

The hitch-and-coupler assembly also includes stop formations, such as stop formation 17 in the form of a back plate that cooperates with the hitch receiver 112 to prevent revolving of the first link member 12 when the bolt and nut 28 is tightened. Another stop formation 83 prevents the bolt of bolt and nut 82 from rotating when it is tightened.

In use, the coupler assembly 108 is mounted onto a trailer vehicle, for example an off-road or cross-country trailer vehicle, and the hitch assembly 106 is mounted on the towing vehicle. When a user wishes to couple the trailer vehicle 100 to the towing vehicle 102, they maneuver the towing vehicle or the trailer vehicle, as the case may be, until the second link member 14 is more-or-less above the first linking member 12. The user then lowers the front end 110 of the trailer 100, so that the second link member, in particular the coupling formation 64, lands onto the landing wall 31 of the guiding arrangement 38.

When the second link member 14 is lowered onto the landing wall 31, and the weight of the trailer vehicle 100 permits it, then the landing wall 31 will exert a component of force against the second linking member 14 in the direction of draft which would tend to displace the trailer vehicle 100 in such way that the coupling formation 46 is guided downwardly along the guide passage 32 by the guiding arrangement 38 into its coupled position. This may occur automatically due to the weight of the trailer vehicle if it is free to move along the ground. It may also require a user to effect movement of one of the vehicles, e.g. pushing the trailer or driving the towing vehicle a small distance in a direction away from the other vehicle.

In the coupled position the blocking pin 42 stops the coupling formation from further downward movement. The pivot bin 26 can then be inserted through the holes 44 and bore 48. Once the pivot pin 26 is inserted, then a lynch-pin or cotter-pin (not shown) can be passed through a transverse hole 59 near the end of the pin 26.

The pivot pin 26 is inserted with the key 52 pointing upwards and the pin is pushed further to compress the coil spring 54 with one hand. The closure member 66 is pulled away with another hand and the pin 26 is rotated so that the key 52 can slip through the gap 64 into the key catch cavity 62. The pin 26 is released and the closure member 66 is released to close the gap.

Figure 7:
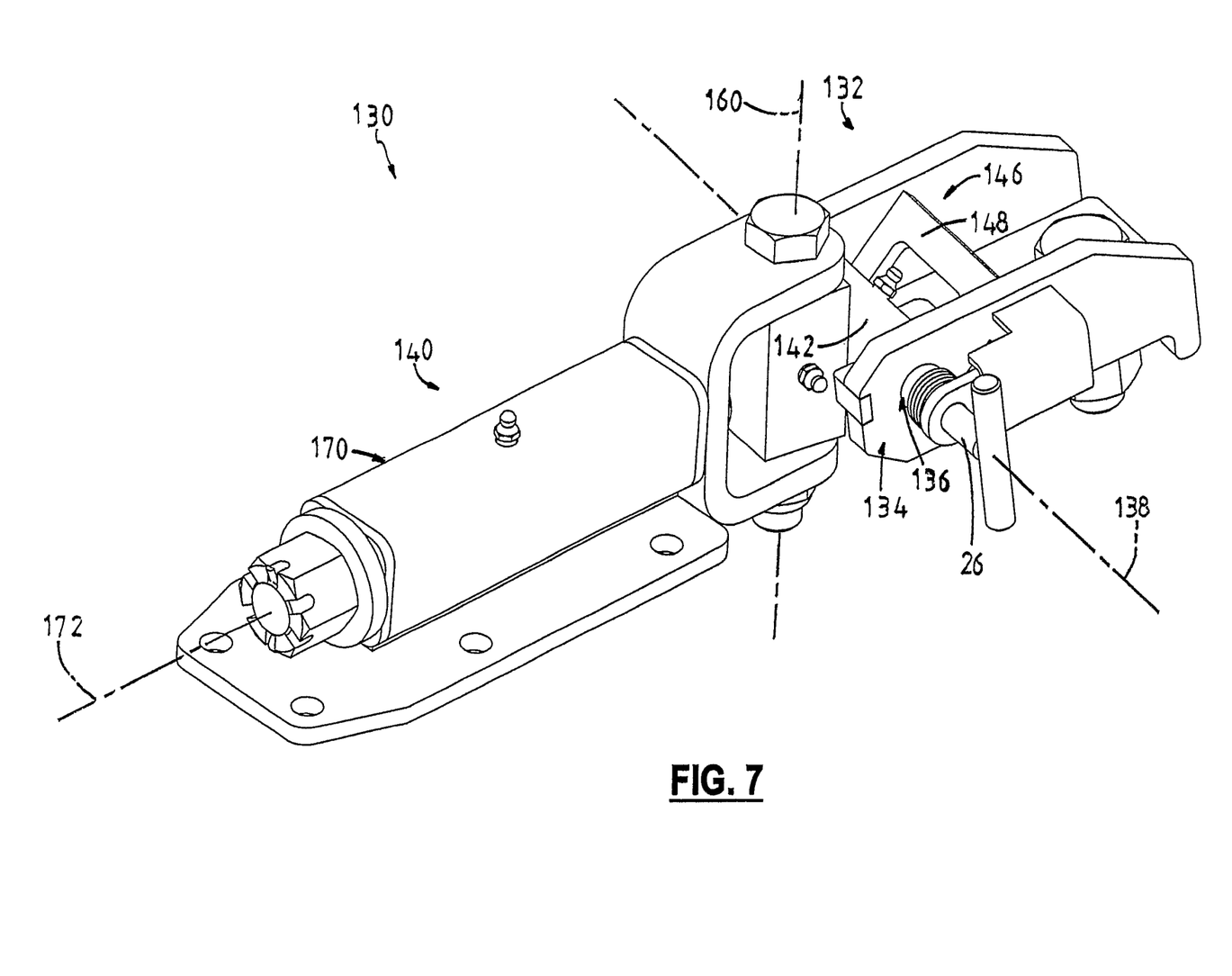
FIG. 7 shows a three-dimensional view of another embodiment of a hitch-and-coupler assembly, in accordance with the invention.

FIG. 7 shows another embodiment, generally indicated by reference numeral 130, of a hitch-and-coupler assembly in accordance with the invention. Some parts of the assembly 130 is similar to that of the assembly 10 as described above, an like parts are indicated with like reference numerals.

The hitch-and-coupler assembly 130 includes a hitch assembly, generally indicated by reference numeral 132. The hitch assembly has a pitch hinge part 134, defining at least one pinhole towards a trailing end of the hitch assembly about a pitch hinge axis 138.

A coupler assembly, generally indicated by reference numeral 140, also forms part of the hitch-and-coupler assembly 130. The coupler assembly 140 includes a pitch hinge counterpart 142 defining at least one pinhole 144 towards a leading end of the coupler assembly 140. The pitch hinge counterpart 142 is detachably connectible to the pitch hinge part 134 by positioning the pitch hinge counterpart 142 into a check position in which the pin holes 136, 144 are aligned for passing a pitch hinge pin 26 there through.

The hitch-and-coupler assembly 130 also includes a guiding arrangement, generally indicated by reference numeral 146, having a guiding surface 148 extending away from the check position toward a leading end of the hitch assembly 132.

Figure 8:
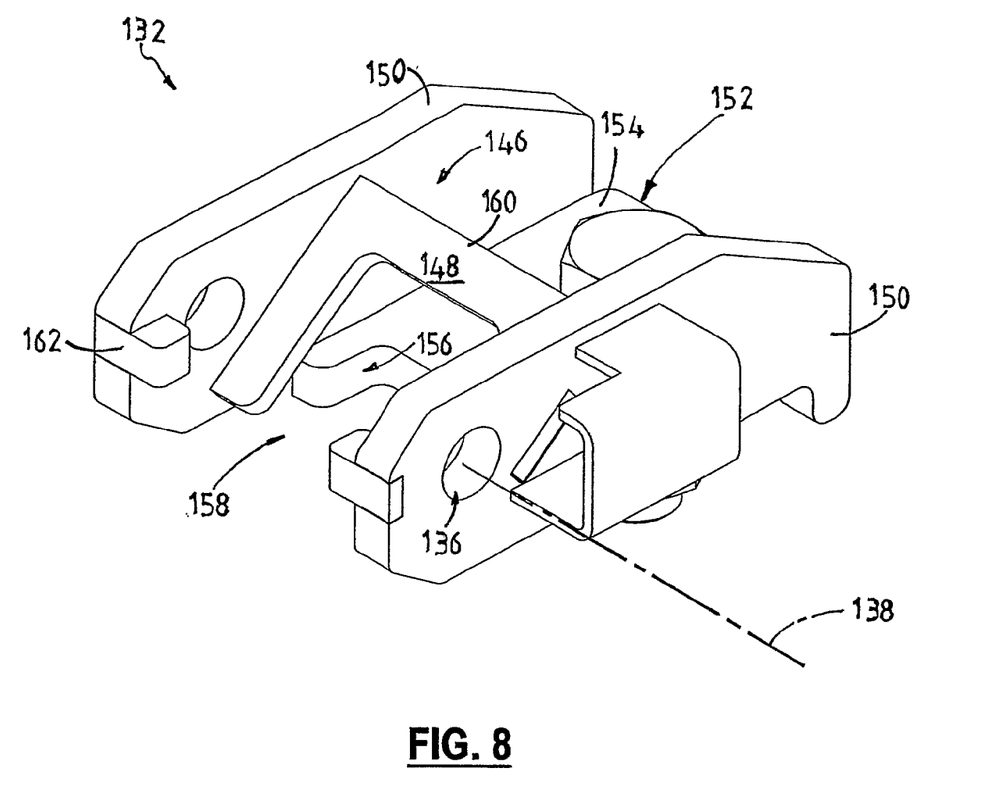
FIG. 8 shows a three-dimensional view of a hitch assembly of the hitch-and-coupler assembly in FIG. 7.
Figure 9:
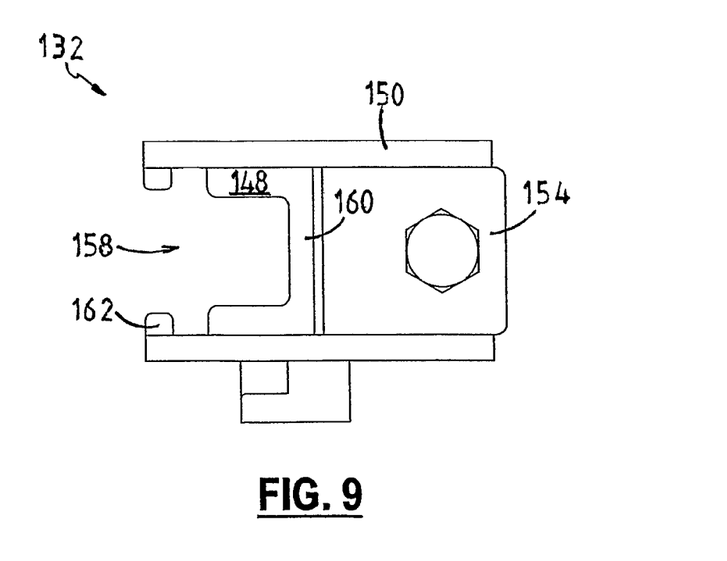
FIG. 9 shows a plan view of the hitch assembly in FIG. 9.

Thus, the pitch hinge counterpart 142 is operatively able to engage the guiding surface 148 and is displaceable along the guiding surface 148 towards the check position. The hitch assembly 132 includes two laterally spaced apart opposing hitch sidewalls 150. Each hitch sidewall 150 defines a pinhole 136 towards its trailing end. The pinholes 136 are axially aligned about the pitch hinge axis 138.

Further, the hitch assembly 132 includes a hitch mounting arrangement 152 for mounting the hitch assembly 132 onto a hitch mount of a towing vehicle. The hitch mounting arrangement 152 includes a hitch mounting wall 154 extending between the hitch sidewalls 150. The hitch mounting wall 154 has a trailing end, at 156, that stops short from the trailing end of the hitch sidewalls 150. Thus, an opening is defined 158 between the sidewalls 150 and the trailing end, at 156, of the hitch mounting wall 154. The opening provides a space for the pitch hinge counterpart 142 to move in when it hinges relative to the pitch hinge part 134. Also, the opening 158 permits debris to fall through the opening, so as to avoid built-up of debris proximate the moving hinge parts that may impart its movement.

The guiding arrangement 146 includes a guide formation 160 that extends between the hitch sidewalls 150. The guide formation 160 defines an operatively upwardly facing guiding surface 148 that extends away from the check position toward the leading end of the hitch assembly 132.

The guide formation 160 is in the form of a rectangular U-shaped wall that extends between the sidewalls 150 and slant from upper edges of the sidewalls 150 towards lower edges of the sidewalls 150 in a direction towards the trailing end of the sidewalls 150. The guide wall 160 extends at least partly across the opening 158 between the sidewalls 150. The U-shaped guide wall 160 defines a rectangular cutaway between its limbs, so as not to block the opening 159 completely.

The guiding arrangement 146 also includes check formations 162 in the form of two check stubs that are mounted opposite each other at the rear end of the sidewalls 150. The check formations are for resisting the pitch hinge counterpart 142 by abutting against it when the pitch hinge counterpart 142 reaches the check position as it slides rearwards along the guiding surface 148.

Figure 10:
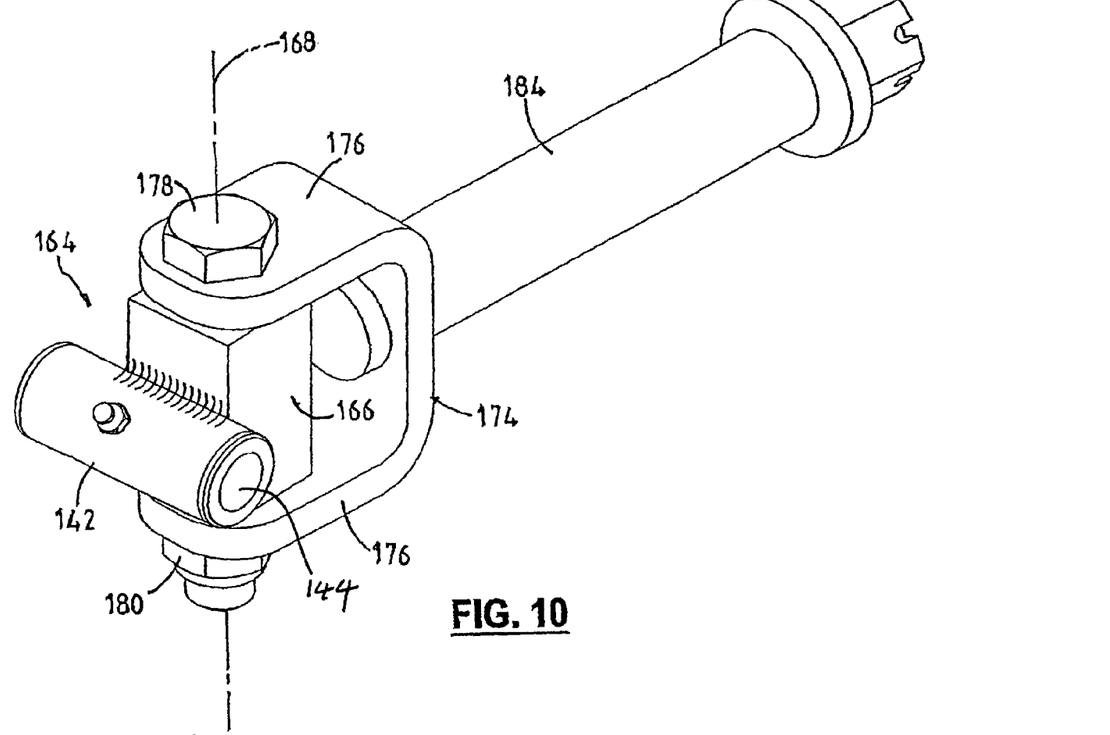
FIG. 10 shows a three-dimensional view of part of a coupler assembly of the hitch-and-coupler assembly in FIG. 7.
Figure 11:
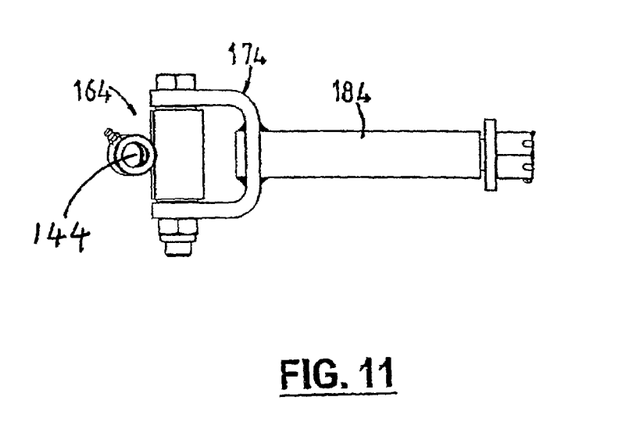
FIG. 11 shows a side elevational view of the part of the coupler assembly in FIG. 10.

The coupler assembly 140 includes a yaw-pitch link member, generally indicated by reference numeral 164. The link member 164 includes the pitch hinge counterpart 142 towards its leading end, and a yaw hinge part 166 towards its trailing end, which yaw hinge part defines at least one pinhole about a yaw axis of the hitch-and-trailer assembly.

The pitch hinge counter part 142 is in the form of an elongated pitch hinge sleeve defining an axially extending through bore. The pitch hinge sleeve 142 has an axial length for sliding fitment lengthwise between the hitch side walls 150 above the guide wall 160. Thus, the guide surface 148 of the guide wall 160 is engaged by an outer radial surface of the pitch hinge sleeve 142 and slidably displaceable along the guide surface 148 into the check position in which the through bore is axially aligned with the pin holes 136 of the side walls 150.

The yaw hinge part 166 is in the form of an elongated rectangular yaw hinge sleeve defining an axially extending through bore about the yaw axis. The pitch hinge sleeve 142 and the yaw hinge sleeve 166 are orthogonally mounted to each other intermediate their ends, so that the pitch hinge axis 138 extends orthogonally relative to the yaw hinge axis 168.

Figure 12:
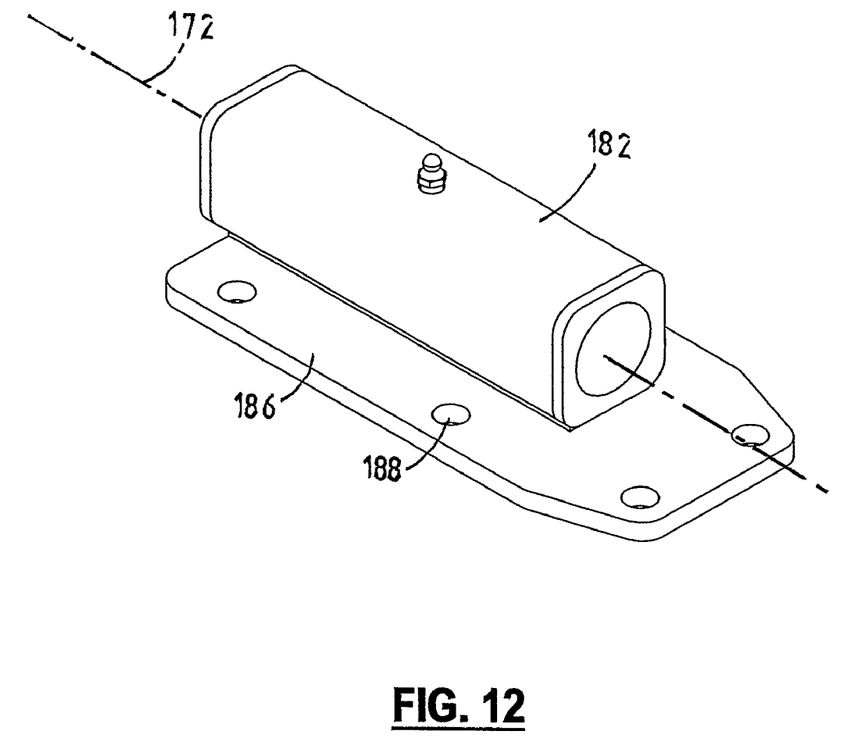
FIG. 12 shows a three-dimensional view of another part of the coupler assembly.
Figure 13:
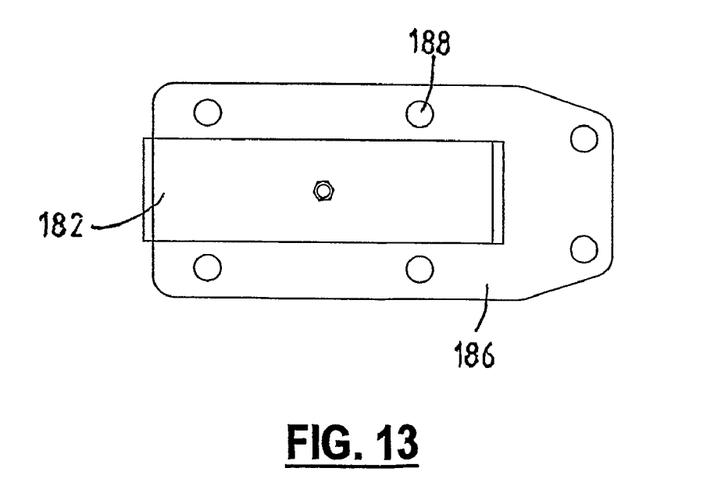
FIG. 13 shows a plan view of the part of the coupler assembly in FIG. 12.

The coupler assembly also includes a roll hinge, generally indicated by reference numeral 170, about a roll axis 172. The roll hinge 170 includes a yaw hinge counterpart 174 towards its leading end. The yaw hinge counterpart 174 defines pinholes for axially aligning with the through bore of the yaw hinge sleeve 166. The yaw hinge counterpart 174 includes a clevis formation having opposed clevis arms 176 defining opposed pinholes that are axially spaced about the yaw axis 168. The clevis arms 176 define a space between them for receiving the yaw hinge sleeve 166 lengthwise between them with its through bore axially aligned with the bolt holes of the clevis arms 176 about the yaw axis 168.

The coupler assembly 140 further includes a yaw bolt 178 for passing through the pinholes of the yaw hinge part 160 and the yaw hinge counter part 174 when they are aligned, and a nut 180 for screwing onto a protruding end of the yaw bolt 178.

The roll hinge 170 also includes a roll hinge sleeve 182: The roll hinge sleeve 182 is rectangular box shaped and defines an axially extending through bore. A roll hinge shaft 184 is coaxially mounted within the roll hinge sleeve through bore for coaxial rotation relative to the sleeve 182 about the roll axis 172. The yaw hinge counterpart 174 is at a front end of the roll hinge shaft 184.

The coupler assembly 140 also includes a coupler mounting arrangement 186 for mounting the coupler onto a coupler mount of a trailer vehicle. The coupler mounting arrangement 186 is in the form of a coupler mounting plate defining at least one coupler mounting hole 188 there through, The roll hinge sleeve 182 is mounted onto the coupler mounting plate 186. The rectangular box-shaped nature of the sleeve 182 provides a flat surface for abutment with the mounting plate 186 so that long edges of the sleeve 192 are closely spaced to the mounting plate 186 which facilitates application of a weld along the long edges for securing the sleeve 182 to the mounting plate 186.

The hitch-and-coupler assemblies 10 and 130 described in this embodiment of the invention has a guiding arrangement that guides one link member into an coupling relationship with another link member. In particular, the guiding arrangement provides a guiding surface that is upwardly facing, so that the pitch hinge part can engage the surface from above. Thus, the guiding arrangement provides an area for the coupler to engage the hitch out of alignment with its pitch hinge parts at first, and then to guide the coupler toward its check position.

It thus assists a user to effect the delicate task of aligning the link members to enable them to be coupled together. This is particularly useful when either the towing vehicle or the trailer vehicle has to be physically moved relative to each other by a user and it is difficult for them to see exactly when the link members are perfectly aligned with each other.

In a usual coupling of the towing vehicle to the trailer, the assembly utilizes the weight of the trailer 100 to guide the second link member 14 into its engaging relationship with the first link member 12. The hitch-and-coupler assembly thus reduces the hands-on handling of the hitch-and-coupler assembly and thus reduces the risk of injury, for example nipping or pinching of a hand of a user by the hitch-and-coupler assembly during coupling.

The hitch-and-coupler assembly 10 also has the advantage that it utilizes the weight of the trailer vehicle 100 to align its linking member, in other words, link member 12 and 14, into their coupling relationship, and thus requires less power from a user to coupler the trailer vehicle 100 to the towing vehicle 102.

Should a trailer's wheels be interfered with by the support surface on which it stand, so that the trailer vehicle can not be moved by the interaction between the landing plate 31 on the second linking member 14, then once the second link member 14 has landed onto the landing wall 38, a user can slowly drive the towing vehicle 102 forwards to effect downwards sliding of the first link member 12 under guidance of the guiding arrangement 38 into its coupled position, where after the user can insert the first pivot pin 26.

A further advantage of the assembly as described is that it is not mechanically complex and it utilizes well known mechanical contrivances. Further it can be manufactured at a reasonable cost.

It is intended that all matter contained in the above description or shown in the accompanying drawings shall be interpreted as illustrative only and not limiting. Changes in detail or structure may be made without departing from the basic elements of the invention as defined herein.

The claims defining the invention are as follows:

1. A hitch-and-coupler assembly which includes:
   a hitch assembly having a pitch hinge part including laterally spaced apart opposing elongated side walls, each hitch side wall defining a pinhole towards its trailing edge, which pinholes are axially aligned about a pitch hinge axis; and
   a coupler assembly having a pitch hinge counterpart defining at least one pinhole towards a leading end of the coupler assembly, the pitch hinge counterpart being detachably connectible to the pitch hinge part by positioning the pitch hinge counterpart into a check position in which the pin holes are aligned for passing a pitch hinge pin there through; and
   a guiding arrangement having a guide formation extending between the hitch sidewalls, which guide formation defines an operatively upwardly facing guiding surface extending away from the check position towards a leading end of the hitch assembly so that the pitch hinge counterpart is operatively able to engage the guiding surface and displaceable along the guiding surface towards the check position.

2. A hitch-and-coupler assembly as claimed in claim 1, in which the hitch assembly includes a hitch mounting arrangement for mounting the hitch assembly onto a hitch mount of a towing vehicle.

3. A hitch-and-coupler assembly as claimed in claim 2, in which the hitch mounting arrangement includes a hitch mounting wall extending transversely across the space between the hitch sidewalls from near the leading end of the hitch sidewalls towards a rear end of the hitch sidewalls.

4. A hitch-and-coupler assembly as claimed in claim 3, in which the mounting wall extends along opposing front portions of the hitch sidewalls, so that a vertically open through passage is defined between opposing rear portions of the hitch sidewalls.

5. A hitch-and-coupler assembly as claimed in claim 1, in which the guide formation includes a guide wall extending between the hitch sidewalls and slanting from upper edges of the sidewalls towards lower edges of the sidewalls in a direction towards the trailing end of the sidewalls.

6. A hitch-and-coupler assembly as claimed in claim 5, in which the guide wall extends at least partly across the opening between the rear portions of the hitch sidewalls and in which the guide wall defines a cutaway in the guide wall.

7. A hitch-and-coupler assembly as claimed in claim 6, in which the guide wall is rectangular U-Shaped and in which a cross limb of the guide wall extends between the sidewalls towards upper edges of the sidewalls and side limbs of the guide wall slant towards the lower edges of the sidewalls in the direction towards the trailing end of the sidewalls.

8. A hitch-and-coupler assembly as claimed in claim 1, in which the coupler assembly includes a yaw-pitch link member having the pitch hinge counterpart towards its leading end and a yaw hinge part towards its trailing end, which yaw hinge part defines at least one pinhole about a yaw axis of the hitch-and-coupler assembly.

9. A hitch-and-coupler assembly as claimed in claim 8, in which the pitch hinge counterpart includes an elongated pitch hinge sleeve defining an axially extending through bore, the sleeve having an axial length for sliding fitment lengthwise between the hitch side walls above the guide wall, so that the guide surface of the guide wall is engaged by an outer radial surface of the pitch hinge sleeve and slidably displaceable along the guide surface into the check position in which the through bore is axially aligned with the pin holes of the hitch sidewalls.

10. A hitch-and-coupler assembly as claimed in claim 9, in which the guiding arrangement include check formations located towards a trailing end of the hitch sidewalls, against which the hitch counterpart checks when it reaches the check position when it is displaced along the guiding surface towards the check position.

11. A hitch-and-coupler assembly as claimed in claim 10, in which the yaw hinge part includes an elongated yaw hinge sleeve defining an axially extending through bore about the yaw axis.

12. A hitch-and-coupler assembly as claimed in claim 11, in which the pitch hinge sleeve and the yaw hinge sleeve are orthogonally attached to each other intermediate their ends, so that the pitch hinge axis extends orthogonally relative to the yaw hinge axis.

13. A hitch-and-coupler assembly as claimed in claim 12, in which the coupler assembly includes a roll hinge about a roll axis, the roll hinge having a yaw hinge counterpart towards its leading end that defines at least one pinhole for axially aligning with the pinholes of the yaw hinge part.

14. A hitch-and-coupler assembly as claimed in claim 13, in which the coupler assembly includes a yaw bolt for passing through the pinholes of the yaw hinge part and the yaw hinge counter part when they are aligned, and a nut for screwing onto a protruding end of the yaw bolt.

15. A hitch-and-coupler assembly as claimed in claim 13, in which the roll hinge includes a roll hinge sleeve and a roll hinge shaft coaxially mounted within the sleeve for coaxial rotation relative to the sleeve about the roll axis, the yaw hinge counterpart being at a front end of the roll hinge shaft and includes a clevis formation having opposed clevis arms defining opposed pinholes that are axially spaced about the yaw axis, the clevis arms defining a space between them for receiving the yaw hinge sleeve lengthwise between them with its through bore axially aligned with the pinholes of the clevis arms about the yaw axis.

16. A hitch-and-coupler assembly as claimed in claim 15, in which the coupler assembly includes a coupler mounting arrangement for mounting the coupler onto a coupler mount of a trailer vehicle, in which the coupler mounting arrangement includes a coupler mounting plate defining at least one coupler mounting hole there through and in which the roll hinge sleeve is mounted onto the coupler mounting plate.

17. A method of coupling a coupler assembly detachably to a hitch assembly, which method includes:
   providing a hitch assembly having a pitch hinge part including laterally spaced apart opposing elongated side walls, each hitch side wall defining a pinhole towards its trailing edge, which pinholes are axially aligned about a pitch hinge axis; and
   providing a coupler assembly having a pitch hinge counterpart defining at least one pinhole towards a leading end of the coupler assembly, the pitch hinge counterpart being detachably connectible to the pitch hinge part by positioning the pitch hinge counterpart into a check position in which the pin holes are aligned for passing a pitch hinge pin there through; and
   providing a guiding arrangement having a guide formation extending between the hitch sidewalls, which guide formation defines an operatively upwardly facing guiding surface extending away from the check position toward a leading end of the hitch assembly so that the pitch hinge counterpart is operatively able to engage the guiding surface and displaceable along the guiding surface towards the check position.

* * * * *